US012581306B1

(12) United States Patent
Park et al.

(10) Patent No.: US 12,581,306 B1
(45) Date of Patent: Mar. 17, 2026

(54) METHOD AND APPARATUS FOR VERIFYING EMERGENCY TEXT MESSAGE

(71) Applicant: KOREA INTERNET & SECURITY AGENCY, Naju-si (KR)

(72) Inventors: Seong Min Park, Naju-si (KR); Joon Hyung Lim, Naju-si (KR); Do Won Kim, Naju-si (KR); Dae Un Kim, Naju-si (KR)

(73) Assignee: KOREA INTERNET & SECURITY AGENCY, Naju-si (KR)

( * ) Notice: Subject to any disclaimer, the term of this patent is extended or adjusted under 35 U.S.C. 154(b) by 0 days.

(21) Appl. No.: 19/174,349

(22) Filed: Apr. 9, 2025

(30) Foreign Application Priority Data

Feb. 6, 2025 (KR) ........................ 10-2025-0015017

(51) Int. Cl.
| | |
|---|---|
| *H04W 12/12* | (2021.01) |
| *H04W 12/08* | (2021.01) |
| *H04W 76/10* | (2018.01) |
| *H04W 76/50* | (2018.01) |

(52) U.S. Cl.
CPC ........... *H04W 12/12* (2013.01); *H04W 76/10* (2018.02)

(58) Field of Classification Search
CPC . H04W 12/12; H04W 12/125; H04W 12/128; H04W 12/06; H04W 12/69; H04W 12/08; H04W 76/10; H04W 76/18; H04W 76/19; H04W 76/20; H04W 76/50
See application file for complete search history.

(56) References Cited

U.S. PATENT DOCUMENTS

| | | | |
|---|---|---|---|
| 12,170,893 B2 * | 12/2024 | Rajadurai | H04W 12/108 |
| 12,219,359 B2 * | 2/2025 | Wang | H04W 24/10 |
| 2016/0353266 A1 * | 12/2016 | Winkler | H04W 12/08 |
| 2021/0385640 A1 * | 12/2021 | Scully | G06Q 50/265 |
| 2022/0201790 A1 * | 6/2022 | Jung | H04W 4/40 |

(Continued)

FOREIGN PATENT DOCUMENTS

| | | |
|---|---|---|
| KR | 10-2010-0054178 | 5/2010 |
| KR | 10-2013-0046481 | 5/2013 |

(Continued)

OTHER PUBLICATIONS

Notice of Allowance issued in KR 10-2025-0015017; mailed by the Korean Intellectual Property Office on Jun. 27, 2025.

*Primary Examiner* — Khawar Iqbal
(74) *Attorney, Agent, or Firm* — Studebaker Brackett PLLC

(57) ABSTRACT

There is provided a method for verifying an emergency text message, performed by a base station, the method may comprise receiving a Radio Resource Control (RRC) Resume Request message from a mobile communication terminal in an inactive state that has received a broadcast message related to an emergency text message, establishing an RRC connection with the mobile communication terminal, receiving a message including a hash value from the mobile communication terminal with which the RRC connection has been established, verifying validity of the hash value included in the received message, and transmitting a message including information indicating receipt of a false emergency text message to the mobile communication terminal when the hash value included in the received message is determined to be invalid.

2 Claims, 7 Drawing Sheets

(56)          References Cited

U.S. PATENT DOCUMENTS

| | | | | |
|---|---|---|---|---|
| 2022/0418030 | A1* | 12/2022 | Guo | H04W 72/30 |
| 2024/0040377 | A1* | 2/2024 | Choi | H04L 9/3247 |
| 2024/0040379 | A1* | 2/2024 | Choi | H04W 12/06 |
| 2024/0114337 | A1* | 4/2024 | Rajadurai | H04W 12/06 |
| 2024/0137817 | A1* | 4/2024 | Da Silva | H04W 8/08 |
| 2024/0340928 | A1* | 10/2024 | Kim | H04W 36/0088 |
| 2025/0126467 | A1* | 4/2025 | Garcia Morchon | |
| | | | | H04W 12/037 |
| 2025/0133625 | A1* | 4/2025 | Kim | H04W 12/041 |

FOREIGN PATENT DOCUMENTS

| | | | |
|---|---|---|---|
| KR | 10-2014-0125785 | | 10/2014 |
| KR | 10-2019-0125392 | | 11/2019 |
| KR | 10-2019-0129636 | | 11/2019 |
| KR | 10-2020-0059448 | | 5/2020 |
| KR | 10-2020-0140559 | | 12/2020 |
| KR | 10-2023-0032591 | A | 3/2023 |
| KR | 10-2023-0053434 | | 4/2023 |
| KR | 10-2023-0092663 | A | 6/2023 |
| KR | 10-2628540 | B1 | 1/2024 |
| KR | 10-2024-0125785 | | 8/2024 |
| KR | 10-2733404 | B1 | 11/2024 |

* cited by examiner

METHOD AND APPARATUS FOR VERIFYING EMERGENCY TEXT MESSAGE

CROSS-REFERENCE TO RELATED APPLICATION

This application claims priority from Korean Patent Application No. 10-2025-0015017 filed on Feb. 6, 2025 in the Korean Intellectual Property Office, and all the benefits accruing therefrom under 35 U.S.C. 119, the contents of which in its entirety are herein incorporated by reference.

BACKGROUND

1. Field

The present disclosure relates to a method and apparatus for verifying whether an emergency text message received by a mobile communication terminal is a false message.

2. Description of the Related Art

Cyberattacks have been evolving in various forms. For example, whereas hacking into servers was a common method in the past, recent attack methods involve disseminating false news through social networking services, personal broadcasts, and other means.

Meanwhile, concerns have been raised regarding cyberattacks that involve stealing information from a specific base station and broadcasting emergency text messages to multiple terminals. For instance, academic reports indicate that attackers may use their own communication equipment to broadcast false emergency text messages to nearby mobile communication terminals, posing as a base station. Such a cyberattack is referred to as an overshadowing attack.

Accordingly, there is a need for security technologies capable of defending against overshadowing attacks.

SUMMARY

One objective of the present disclosure is to provide a method and apparatus for verifying whether an emergency text message is a false text message associated with a cyberattack.

Another objective of the present disclosure is to provide a method and an apparatus for verifying an emergency text message in a manner applicable to international standard specifications.

The objectives of the present disclosure are not limited to those mentioned above, and other objectives not explicitly stated will be clearly understood by those skilled in the art based on the following description.

According to an aspect of the present disclosure, there is provided a method for verifying an emergency text message, performed by a base station, the method may comprise receiving a Radio Resource Control (RRC) Resume Request message from a mobile communication terminal in an inactive state that has received a broadcast message related to an emergency text message, establishing an RRC connection with the mobile communication terminal, receiving a message including a hash value from the mobile communication terminal with which the RRC connection has been established, verifying validity of the hash value included in the received message, and transmitting a message including information indicating receipt of a false emergency text message to the mobile communication terminal when the hash value included in the received message is determined to be invalid.

In some embodiments, the verifying the validity of the hash value may comprise identifying a System Information Block (SIB) or a Master Information Block (MIB) related to the broadcast message, calculating a hash value for the identified SIB or MIB, and determining that the hash value included in the received message is valid when it matches the calculated hash value. In some embodiments, the method may further comprise transmitting a message including information indicating receipt of a legitimate emergency text message to the communication terminal, when the hash value included in the received message is determined to be valid.

In some embodiments, the message including the hash value may be a message related to RRC Resume Complete.

According to the aforementioned and other embodiments of the present disclosure, there is provided a method for verifying an emergency text message, performed by a base station, the method may comprise after re-authentication of a mobile communication terminal in an idle state is completed, transmitting an Access Stratum (AS) Security Mode Command to the mobile communication terminal, receiving a security mode complete message including a hash value from the mobile communication terminal, verifying validity of the hash value included in the security mode complete message, and transmitting a message including information indicating receipt of a false emergency text message to the communication terminal, when the hash value included in the security mode complete message is determined to be invalid.

In some embodiments, the verifying the validity of the hash value may comprise identifying a System Information Block (SIB) or a Master Information Block (MIB) related to a broadcast message, calculating a hash value for the identified SIB or MIB, and determining that the hash value included in the security mode complete message is valid when it matches the calculated hash value.

In some embodiments, the method may further comprise transmitting, to the mobile communication terminal, a message including information indicating that a legitimate emergency text message has been received, when the hash value included in the security mode complete message is determined to be valid.

According to the aforementioned and another embodiments of the present disclosure, there is provided a communication device comprising at least one processor, and a memory storing a computer program executed by the at least one processor. The computer program may include instructions for operations of: receiving a Radio Resource Control (RRC) Resume Request message from a mobile communication terminal in an inactive state that has received a broadcast message related to an emergency text message, establishing an RRC connection with the mobile communication terminal, receiving a message including a hash value from the mobile communication terminal with which the RRC connection has been established, verifying validity of the hash value included in the received message, and transmitting a message including information indicating receipt of a false emergency text message, when the hash value included in the received message is determined to be invalid.

In some embodiments, the operation of verifying the validity of the hash value may comprise identifying a System Information Block (SIB) or a Master Information Block (MIB) related to the broadcast message, calculating a hash value for the identified SIB or MIB, and determining that the hash value included in the received message is valid when it matches the calculated hash value.

In some embodiments, the computer program may further include3 instructions for an operation of transmitting, to the mobile communication terminal, a message including information indicating that a legitimate emergency text message has been transmitted, when the hash value included in the received message is determined to be valid.

In some embodiments, the message including the hash value may be an RRC Resume Complete-related message.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION

Figure 1:
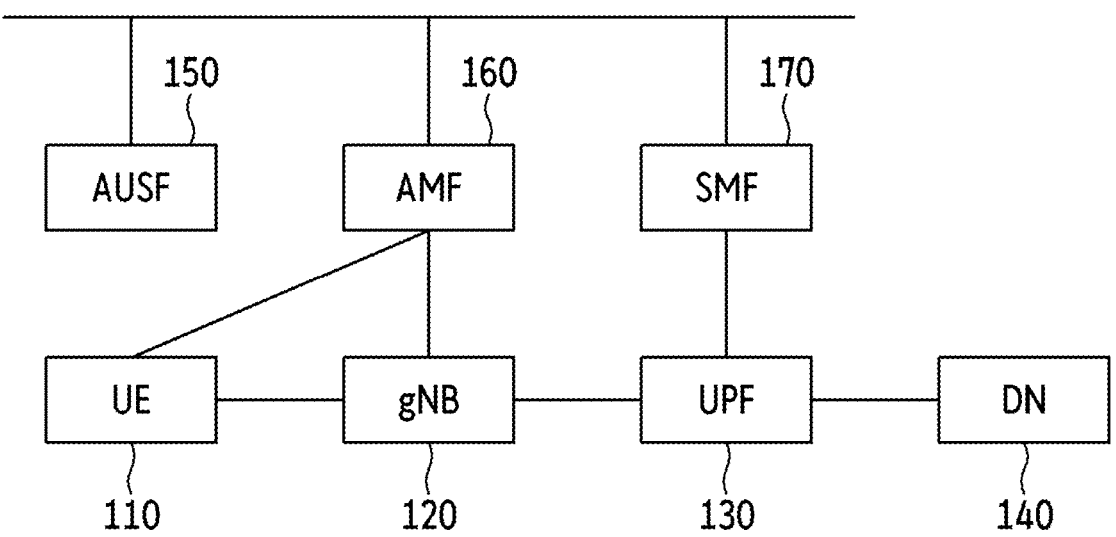
FIG. 1 is a diagram illustrating a mobile communication system according to an embodiment of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Embodiments of the present disclosure will hereinafter be described with reference to the accompanying drawings.

FIG. 1 is a diagram illustrating a mobile communication system according to an embodiment of the present disclosure.

Referring to FIG. 1, the mobile communication system may include a User Equipment (UE) 110, a Next-Generation Node B (gNB) 120, a User Plane Function (UPF) 130, a Data Network (DN) 140, an Authentication Server Function (AUSF) 150, an Access and Mobility Management Function (AMF) 160, and a Session Management Function (SMF) 170.

The UE 110, which is a mobile communication terminal carried by a user, may perform wireless communication with the gNB 120. The UE 110 may be located within a cell formed by the gNB 120.

When the UE 110 completes a connection to the gNB 120, the UE 110 may be in one of three states: an active state, an inactive state, or an idle state. If the UE 110 receives a message from or transmits a message to the gNB 120 within a predetermined first time, the UE 110 may be in the active state. If the UE 110 neither receives a message from nor transmits a message to the gNB 120 for more than a predetermined second time, the UE 110 may be in the inactive state. Additionally, if the UE 110 neither receives a message from nor transmits a message to the gNB 120 for more than a predetermined third time, the UE 110 may be in the idle state.

The UE 110 may receive an emergency text message transmitted by the gNB 120. An emergency text message, which the UE 110 can receive regardless of authentication, is also referred to as a Public Warning System (PWS) message. That is, even if authentication is unsuccessful, the UE 110 may still receive an emergency text message from the gNB 120.

When the UE 110 receives a broadcast message related to an emergency text message, the UE 110 may generate a hash value and then transmit a message including the hash value to the gNB 120. The hash value may be used to verify whether the emergency text message is false.

The gNB 120, a base station in a 5G network with one or more antennas, may perform wireless communication with the UE 110 using a predetermined frequency band. The gNB 120 may establish a Radio Resource Control (RRC) connection with the UE 110. The gNB 120 may transmit and receive data with the UE 110 using frames.

The gNB 120 may transmit a broadcast message including an emergency text message to deliver the emergency text message to each UE 110 within its cell coverage. In one embodiment, the gNB 120 may receive a message including a hash value from a UE 110 that has received the broadcast message containing the emergency text message. In this case, the gNB 120 may verify whether the hash value included in the received message is valid and, if the hash value is successfully verified, transmit an RRC message to the UE 110 indicating receipt of a legitimate emergency text message.

The UPF 130 may process data packets and manage connectivity with the internet or other networks. In one embodiment, the UPF 130 may route packets occurring between the UE 110 and the DN 140.

The AUSF 150 may perform authentication for the UE 110. To this end, the AUSF 150 may store authentication data for each UE 110. Additionally, the AUSF 150 may store a list of supplementary services subscribed to by each UE 110.

The AMF 160 may perform user registration, connection management, and mobility management. In one embodiment, the AMF 160 may perform user authentication or registration. In one embodiment, the AMF 160 may authenticate the UE 110 together with the AUSF 150.

Additionally, the AMF 160 may process Non-Access Stratum (NAS) messages. Furthermore, the AMF 160 may perform mobility management (e.g., handovers) for the UE 110.

The SMF 170 may manage sessions for the UE 110. For example, the SMF 170 may handle session setup, modification, and release. Additionally, the SMF 170 may assign an IP address to the UE 110.

Based on a broadcast message transmitted by the gNB 120, the UE 110 may establish a connection with the gNB 120. Specifically, the gNB 120 may periodically transmit a broadcast message to guide the UE 110 to connect. When UE 110 within the cell of the gNB 120 is powered on, the UE 110 may scan various frequency bands to identify a specific frequency associated with the broadcast message in order to connect with the gNB 120. The UE 110 may perform cell selection by detecting a Primary Synchronization Signal (PSS) and a Secondary Synchronization Signal (SSS) based on the broadcast message. Through this process, the UE 110 may synchronize with the frequency of the gNB 120 for subsequent communication. During the synchronization process, the gNB 120 may allocate wireless resources to blocks referred to as Physical Resource Blocks (PRBs), which define data slots within each subframe.

According to 3rd Generation Partnership Project (3GPP) standard specifications, a broadcast message may be included in a frame of a predefined format.

Figure 2:
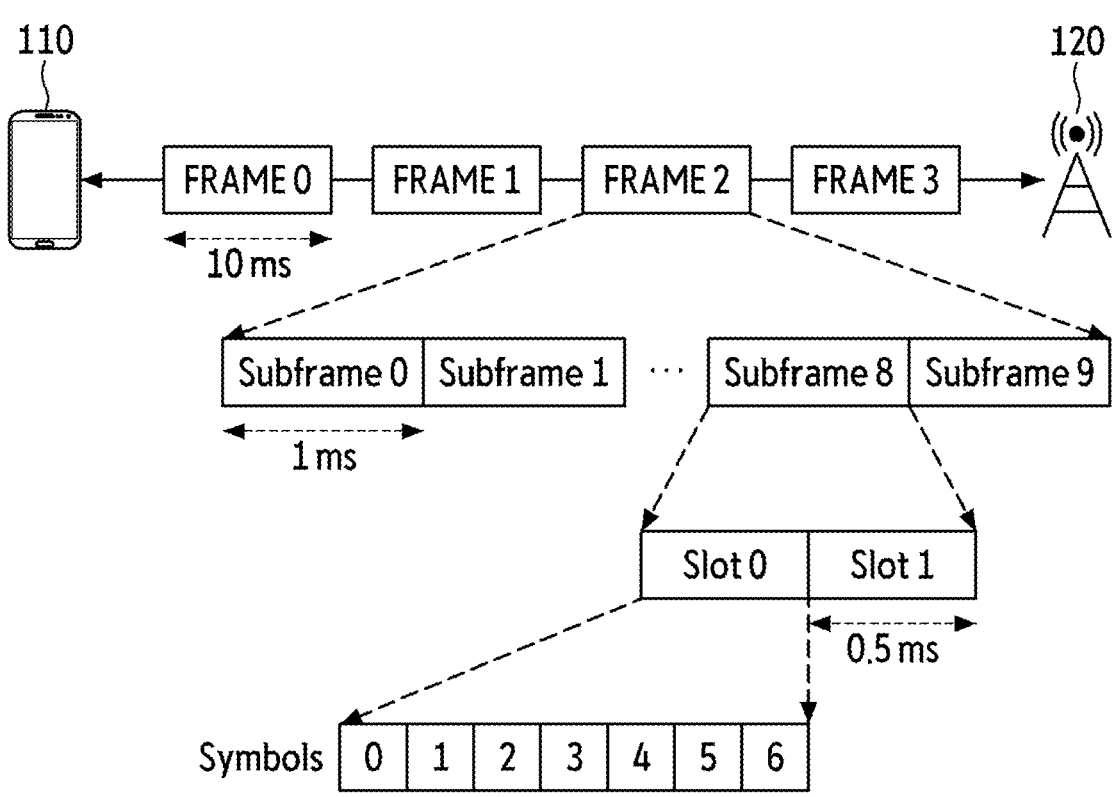
FIG. 2 is a diagram illustrating the frame of a broadcast message used between a User Equipment (UE) and a Next-Generation Node B (gNB)

FIG. 2 is a diagram illustrating the frames of a broadcast message used between a UE and a gNB.

Referring to FIG. 2, each block may include a slot consisting of seven symbols. Two slots may form a subframe with a duration of one millisecond. Additionally, ten subframes may constitute a frame with a duration of ten milliseconds.

In this broadcast message frame structure, elements such as a Physical Cell Identity (PCI), a Master Information Block (MIB), and a System Information Block (SIB) may be analyzed. Once this information is analyzed, the cell serving a UE 110 may be identified, and the transmission timing for a lower frame may also be identified.

An adversary may send a false emergency text message to the UE 110 by exploiting the identified lower frame transmission timing. In this case, the UE 110 may receive the false emergency text message, which may lead to social disruption.

Figure 3:
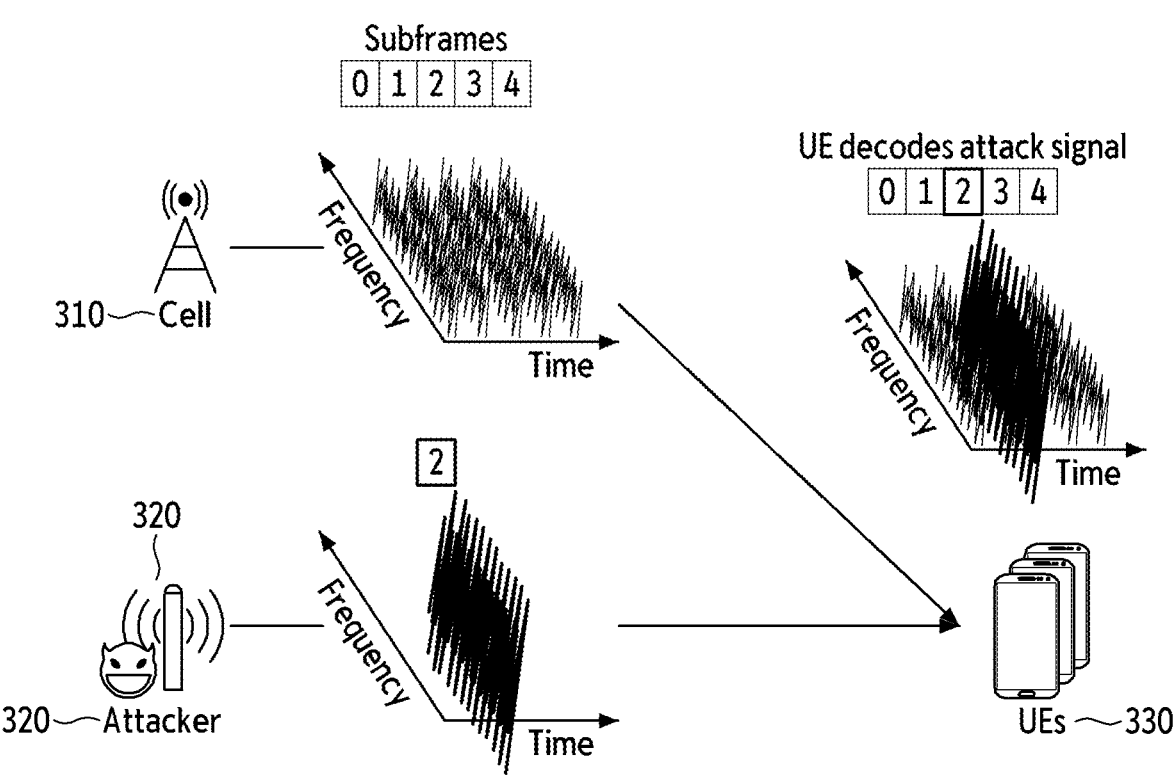
FIG. 3 is a diagram illustrating an overshadowing attack.

FIG. 3 is a diagram illustrating an overshadowing attack.

Referring to FIG. 3, communication is performed between a gNB 310 and multiple UEs 330 through frame #2. An adversary 320 may analyze the data in a broadcast message and detect that the UEs 330 and the gNB 310 are communicating with each other through frame #2. The adversary 320 may insert a false emergency text message into frame #2 and transmit a broadcast message containing the false emergency text message. In this case, the UEs 330 may receive the false emergency text message, causing users to react to it.

Accordingly, a method is needed to verify whether the emergency text message received by the UEs 330 is false.

To address the issue of overshadowing attacks, 3GPP TR 33.809 proposes various solutions. That is, security solutions utilizing hash values, symmetric keys, and asymmetric keys have been suggested.

However, security solutions based on hash values are only executed when UEs are in an active state. If UEs are in an inactive state or an idle state, they may remain vulnerable to overshadowing attacks.

Furthermore, methods using symmetric keys or asymmetric keys present difficulties in key management. For example, in a small-scale environment, managing keys for each UE may not be problematic. However, in a large-scale environment such as a mobile communication network, managing keys for each UE incurs significant resource and cost burdens.

In embodiments to be described, solutions are provided for verifying a false emergency text message based on a hash value, even when a UE is in an inactive state or an idle state.

Figure 4:
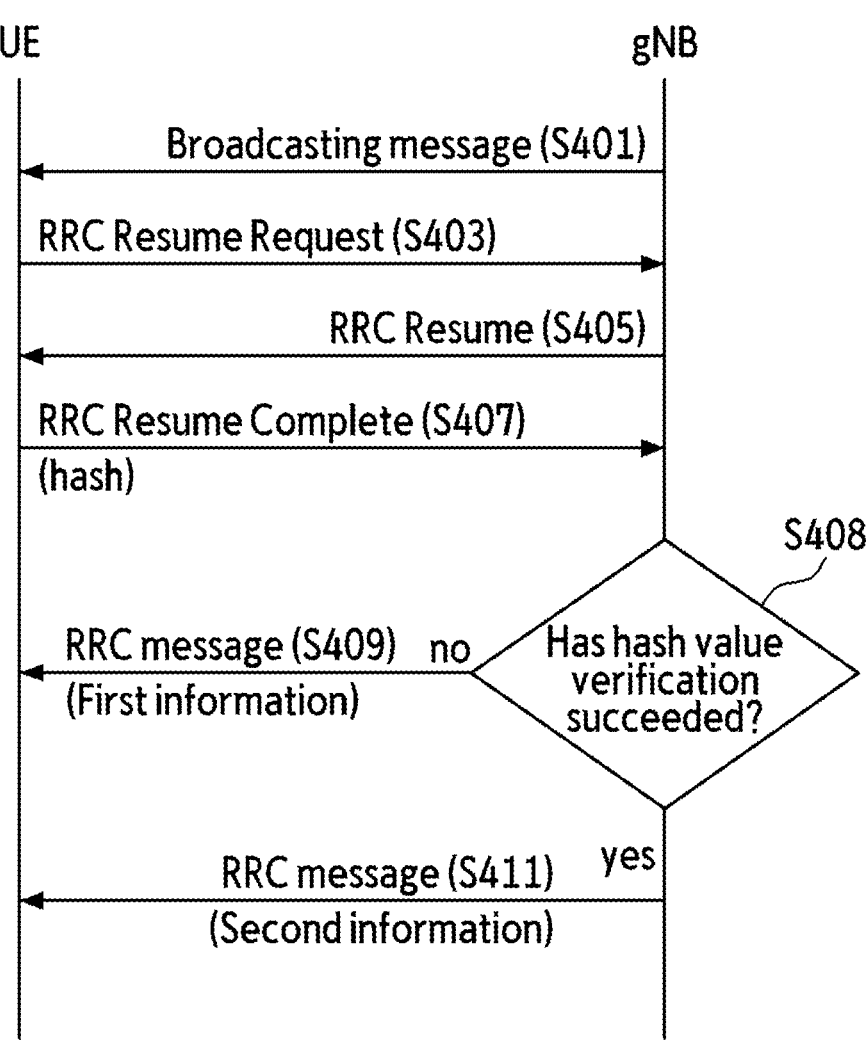
FIG. 4 is a signal flow diagram illustrating a method for verifying an emergency text message when a UE is in an inactive state, according to an embodiment of the present disclosure.

FIG. 4 is a signal flow diagram illustrating a method for verifying an emergency text message when a UE is in an inactive state, according to an embodiment of the present disclosure.

Referring to FIG. 4, a gNB may transmit a broadcast message including an emergency text message (S401). The broadcast message may be received by multiple UEs located within the cell of the gNB.

Among the multiple UEs, a UE in an inactive state may perform a routine to establish an RRC connection. The UE may transmit an RRC Resume Request to the gNB (S403).

Thereafter, in response to receiving the RRC resume request, the gNB may transmit an RRC Resume message to the UE (S405). The UE may generate a hash value and transmit an RRC Resume Complete message, including the generated hash value, to the gNB (S407). In one embodiment, after generating a hash value for an SIB or an MIB included in the broadcast message, the UE may transmit an RRC Resume Complete message including the generated hash value to the gNB. Here, the hash value for the MIB may be obtained by applying a hash function to all or part of the data recorded in the MIB. Similarly, the hash value for the SIB may be obtained by applying a hash function to all or part of the data in the SIB.

Thereafter, the gNB may extract the hash value included in the RRC Resume Complete message and verify its validity (S408). Specifically, the gNB may identify the SIB or MIB included in the broadcast message transmitted to the UE, generate a hash value for the identified SIB or MIB, and determine whether the generated hash value matches the hash value extracted from the RRC Resume Complete message, thereby verifying the validity of the extracted hash value.

If the extracted hash value fails verification (i.e., does not match the generated hash value), the gNB may transmit, to the UE, an RRC message including first information indicating receipt of a false emergency text message (S409). Upon receiving the RRC message including the first information, the UE may identify that it has received a false emergency text message, and may take a follow-up action. Here, the follow-up action may include deleting the false emergency text message or outputting a warning message indicating receipt of the false emergency text message. Additionally, the follow-up action may include reporting a message to a designated reporting center (not illustrated) indicating that a cyber attacker is nearby.

Conversely, if the extracted hash value is successfully verified (i.e., matches the generated hash value), the gNB may transmit an RRC message including second information indicating receipt of a legitimate emergency text message to the UE (S411). Upon receiving the RRC message including the second information, the UE may determine that it has received a legitimate emergency text message.

According to this embodiment, even when a UE is in an inactive state, a hash value can be used to quickly and conveniently verify whether an emergency text message is false.

Figure 5:
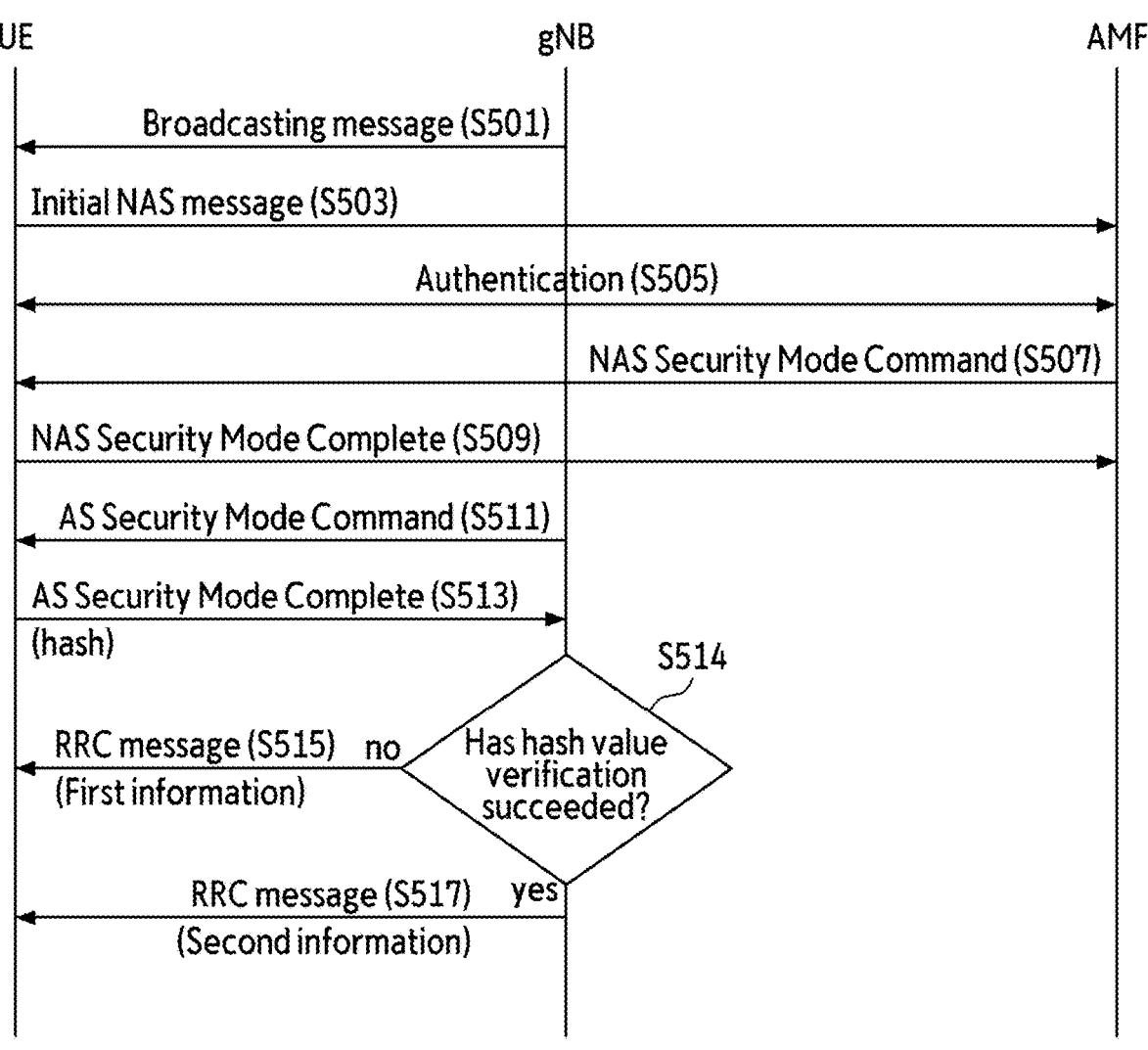
FIG. 5 is a signal flow diagram illustrating a method for verifying an emergency text message when a UE is in an idle state, according to an embodiment of the present disclosure.

FIG. 5 is a signal flow diagram illustrating a method for verifying an emergency text message when a UE is in an idle state, according to an embodiment of the present disclosure.

Referring to FIG. 5, a gNB may transmit a broadcast message including an emergency text message (S501). The broadcast message may be received by multiple UEs located within the cell of the gNB.

Among the multiple UEs, a UE in an idle state may perform a routine for authentication. The UE may transmit an Initial NAS message to an AMF to establish a secure connection (S503). The Initial NAS message may be transmitted to the AMF via the gNB. Additionally, the Initial NAS message may include a UE identifier and security information. The UE identifier may be an IMSI or a 5G-Globally Unique Temporary Identifier (GUTI). The security information may include an NAS Key Set Identifier (NASKSI).

Thereafter, re-authentication may be performed between the UE and the AMF (S505). For example, the AMF may authenticate the UE based on its identifier. In this case, the AMF may perform authentication for the UE together with an AUSF.

Once the UE is successfully authenticated, the AMF may transmit a NAS Security Mode Command to the UE (S507). The NAS Security Mode Command may include integrity protection/encryption algorithm information and an NAS security context.

Thereafter, based on the NAS Security Mode Command, the UE may apply specific security settings and transmit a NAS Security Mode Complete message (S509). At this time, the UE may apply specific security settings based on the integrity protection/encryption algorithm information and the NAS security context included in the NAS Security Mode Command.

Thereafter, to establish security at the RRC layer, the gNB may transmit an Access Stratum (AS) Security Mode Command to the UE (S511). The AS Security Mode Command may include encryption algorithm information and security key setting information.

Thereafter, based on the AS Security Mode Command, the UE may perform security settings and generate a hash value. The UE may then transmit an AS Security Mode Complete message, indicating that security settings have been completed (S513). At this time, the UE may include the generated hash value in the AS Security Mode Complete message. In one embodiment, after generating a hash value for an SIB or an MIB included in the broadcast message, the UE may transmit an AS Security Mode Complete message including the generated hash value to the gNB.

Thereafter, the gNB may extract and verify the hash value included in the AS Security Mode Complete message (S514). Specifically, the gNB may identify the SIB or MIB included in the broadcast message transmitted to the UE, generate a hash value for the identified SIB or MIB, and determine whether the generated hash value matches the hash value extracted from the AS Security Mode Complete message, thereby verifying the validity of the extracted hash value.

If the extracted hash value fails verification (i.e., does not match the generated hash value), the gNB may transmit an RRC message including first information indicating receipt of a false emergency text message to the UE (S515). Upon receiving the RRC message including the first information, the UE may determine that it has received a false emergency text message, and may take a follow-up action. Here, the follow-up action may include deleting the false emergency text message or outputting a warning message indicating receipt of the false emergency text message. Additionally, the follow-up action may include reporting a message to a designated reporting center (not illustrated) indicating that a cyber attacker is nearby.

Conversely, if the extracted hash value is successfully verified (i.e., matches the generated hash value), the gNB may transmit an RRC message including second information indicating receipt of a legitimate emergency text message to the UE (S517). Upon receiving the RRC message including the second information, the UE may determine that it has received a legitimate emergency text message.

According to this embodiment, even when a UE is in an idle state, a hash value can be used to quickly and conveniently verify whether an emergency text message is false.

Figure 6:
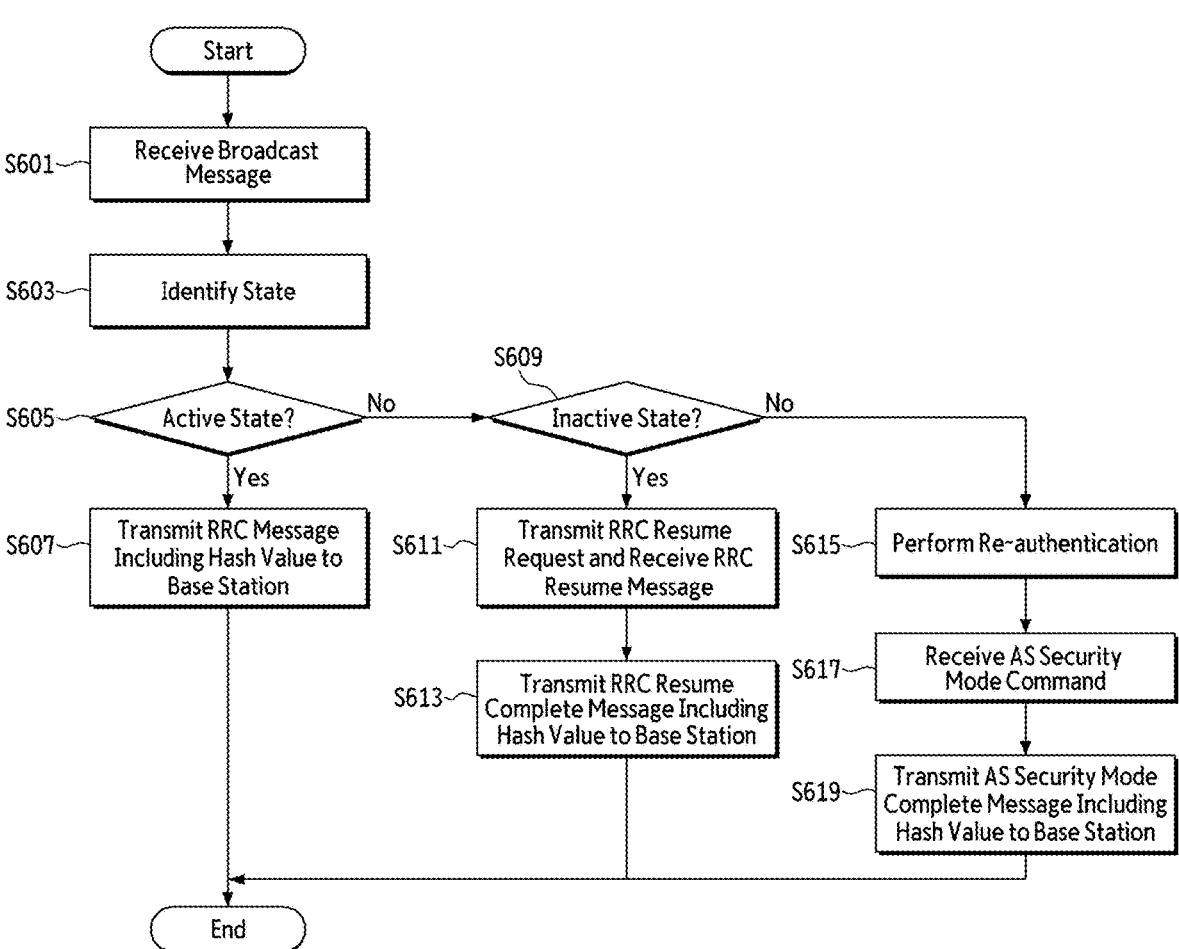
FIG. 6 is a flowchart illustrating how a UE operates for verifying an emergency text message according to an embodiment of the present disclosure.

FIG. 6 is a flowchart illustrating how a UE operates for verifying an emergency text message according to an embodiment of the present disclosure.

Referring to FIG. 6, a UE may receive a broadcast message related to an emergency text message from a gNB (S601).

Thereafter, the UE may determine whether its state is an active state, an inactive state, or an idle state (S603). If the UE is in an active state (S605), it may transmit an RRC message including a hash value to the gNB (S607).

Meanwhile, if the UE is in an inactive state (S609), it may transmit an RRC Resume Request to the gNB and then receive an RRC Resume message from the gNB (S611).

Thereafter, the UE may generate a hash value and transmit an RRC Resume Complete message including the generated hash value to the gNB (S613). In one embodiment, after generating a hash value for an SIB or an MIB included in the broadcast message, the UE may transmit an RRC Resume Complete message including the generated hash value to the gNB.

Thereafter, the UE may receive an RRC message from the gNB containing information indicating receipt of a legitimate emergency text message. If the hash value calculated by the gNB does not match the hash value included in the RRC Resume Complete message, the RRC message may include information indicating receipt of a false emergency text message.

Meanwhile, if the UE is in an idle state, it may perform re-authentication (S615). Specifically, as performed in steps S503 and S505 of FIG. 5, the UE may transmit an Initial NAS message including its identifier to the AMF to perform re-authentication.

After successfully completing re-authentication, the UE may receive an AS Security Mode Command from the gNB (S617).

Thereafter, the UE may generate a hash value and transmit an AS Security Mode Complete message including the generated hash value to the gNB (S619). In one embodiment, after calculating a hash value for an SIB or an MIB included in the broadcast message, the UE may transmit an AS Security Mode Complete message including the calculated hash value to the gNB. Thereafter, the UE may receive an RRC message from the gNB containing information on whether a legitimate or false emergency text message has been received. If the hash value generated by the gNB does not match the hash value included in the RRC Resume Complete message, the RRC message may include information indicating receipt of a false emergency text message.

In the aforementioned embodiments, the gNB has been described as being a base station, but the present disclosure is not limited thereto. It is to be noted that the aforementioned embodiments may also be applied to base stations and mobile communication terminals included in mobile communication systems other than 5G, such as 6G, Open RAN, private networks, and LTE.

Figure 7:
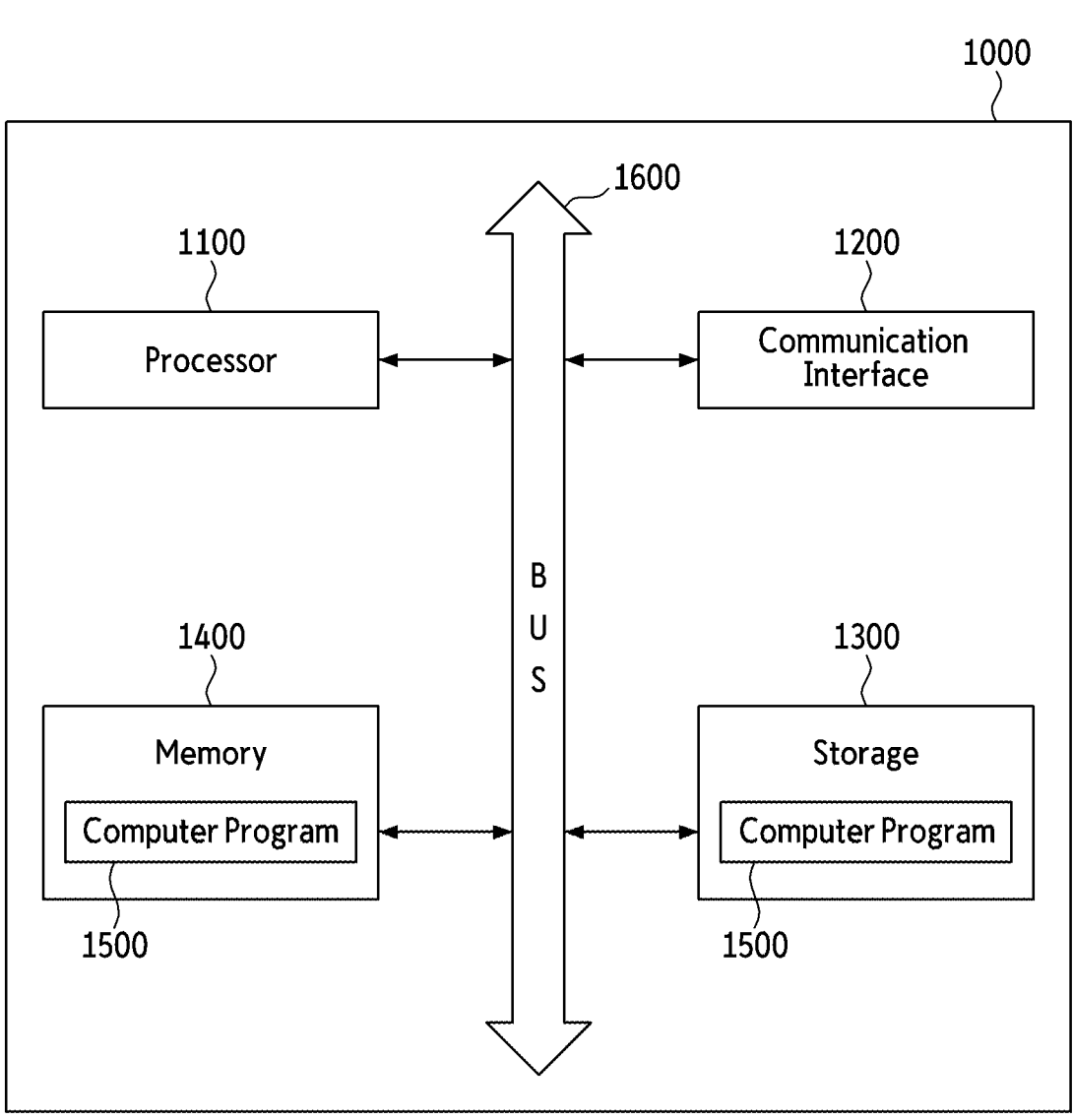
FIG. 7 is an exemplary hardware configuration diagram illustrating how a communication device can be implemented in various embodiments.

FIG. 7 is an exemplary hardware configuration diagram illustrating how a communication device can be implemented in various embodiments. The communication device of FIG. 7 may be associated with the aforementioned base station (i.e., gNB) or UE.

FIG. 7 is a hardware configuration view of an exemplary communication device 1000 according to some embodiments of the present disclosure. The hardware configuration diagram illustrated in FIG. 7 may be a hardware configuration diagram for the gNB or UE described above.

The communication device 1000 may include at least one processor 1100, a bus 1600, a communication interface 1200, a memory 1400, which loads a computer program 1500 to be executed by the processor 1100, and a storage 1300, which stores the computer program 1500. Only components related to the embodiment are illustrated in FIG. 7. Accordingly, a person skilled in the art to which the embodiments of the present disclosure may recognize that other general components may be included in addition to the components illustrated in FIG. 7.

The processor 1100 may control the overall operation of each of the components of the communication device 1000. The processor 1100 may be configured to include at least one of a central processing unit (CPU), a micro-processor unit (MPU), a micro-controller unit (MCU), a graphics processing unit (GPU), or any form of processor well-known in the field of the present disclosure. Additionally, the processor 1100 may perform computations for at least one application or program to execute operations/methods according to some embodiments of the present disclosure. The communication device 1000 may be equipped with one or more processors.

The memory 1400 may store various data, commands, and/or information. The memory 1400 may load the computer program 1500 from the storage 1300 to execute the operations/methods according to some embodiments of the present disclosure. The memory 1400 may be implemented as a volatile memory such as a random-access memory (RAM), but the present disclosure is not limited thereto.

The bus 1600 may provide communication functionality between the components of the communication device 1000. The bus 1600 may be implemented in various forms such as an address bus, a data bus, and a control bus. The communication interface 1200 may be connected to a communication network. The communication interface 1200 may include a communication circuit so as to communicate with a base station.

The storage 1300 may non-transitorily store at least one computer program 1500. The storage 1300 may be configured to include a non-volatile memory such as a flash memory, as well as a computer-readable recording medium in any form well-known in the technical field of the present disclosure, such as a hard disk or a removable disk.

The computer program 1500 may include one or more instructions that enable the processor 1100 to perform the operations/methods according to various embodiments of the present disclosure when loaded into the memory 1400. In other words, by executing the loaded instructions, the processor 1100 may perform the operations/methods according to various embodiments of the present disclosure. The computer program 1500 may include instructions for methods according to various embodiments described with reference to FIGS. 4 to 6.

According to one embodiment, if the communication device 1000 is a base station, the computer program 1500 may include instructions for operations of: receiving a Radio Resource Control (RRC) Resume Request message from a mobile communication terminal in an inactive state that has received a broadcast message related to an emergency text message, establishing an RRC connection with the mobile communication terminal; receiving a message including a hash value from the mobile communication terminal with which the RRC connection has been established, verifying validity of the hash value included in the received message, and transmitting a message including information indicating receipt of a false emergency text message, when the hash value included in the received message is determined to be invalid.

In some embodiments, if the communication device 1000 is a base station, the computer program 1500 may include instructions for operations of: after re-authentication of a mobile communication terminal in an idle state is completed, transmitting an Access Stratum (AS) Security Mode Command to the mobile communication terminal, receiving a security mode complete message including a hash value from the mobile communication terminal, verifying validity of the hash value included in the security mode complete message and transmitting a message including information indicating receipt of a false emergency text message to the communication terminal, when the hash value included in the security mode complete message is determined to be invalid.

In some embodiments, if the communication device 1000 is a mobile communication terminal, the computer program 1500 may include instructions for operations of: receiving a broadcast message related to an emergency text message from a base station, performing Radio Resource Control (RRC) reconnection with the base station in response to the mobile communication terminal being in an inactive state, after the performing RRC reconnection with the base station is completed, transmitting a first message including a hash value to the base station, and receiving, from the base station, an RRC message including information on whether the emergency text message has been properly received.

In some embodiments, if the communication device 1000 is a mobile communication terminal, the computer program 1500 may include instructions for operations of: receiving a broadcast message related to an emergency text message from a base station, performing re-authentication in response to the mobile communication terminal being in an idle state, configuring security to be applied to communication with the base station in response to successful re-authentication, after the configuring security is completed, transmitting a first message including a hash value to the base station, and receiving, from the base station, a Radio Resource Control (RRC) message including information on whether the emergency text message has been properly received.

So far, a variety of embodiments of the present disclosure and the effects according to embodiments thereof have been mentioned with reference to FIGS. 1 to 7. The effects according to the technical idea of the present disclosure are not limited to the forementioned effects, and other unmentioned effects may be clearly understood by those skilled in the art from the description of the specification.

The methods according to the embodiments of the present disclosure described above may be performed by executing a computer program implemented using a computer-readable code. The computer program may be transmitted from a first computing device to a second computing device via a network such as the Internet and installed on the second computing device, and may be used by the second computing device. Furthermore, although the operations are illustrated in a specific order in the drawings, it should not be understood that the operations should be executed in the specific order as illustrated or in a sequential order or that all illustrated operations should be executed to acquire a desired result. In certain situations, multitasking and parallel processing may be advantageous.

Although some embodiments of the present disclosure have been described above with reference to the accompanying drawings, the present disclosure may not be limited to some embodiments and may be implemented in various different forms. Those of ordinary skill in the technical field to which the present disclosure belongs will be able to appreciate that the present disclosure may be implemented in other specific forms without changing the technical idea or essential features of the present disclosure. Therefore, it should be understood that some embodiments as described above are not restrictive but illustrative in all respects.

What is claimed is:

1. A method for verifying an emergency text message, performed by a base station, the method comprising:

receiving a Radio Resource Control (RRC) Resume Request message from a mobile communication terminal in an inactive state that has received a broadcast message related to an emergency text message;

establishing an RRC connection with the mobile communication terminal;

receiving a message including a first hash value from the mobile communication terminal with which the RRC connection has been established;

verifying validity of the first hash value included in the received message;

transmitting a message including information indicating receipt of a false emergency text message to the mobile communication terminal when the first hash value included in the received message is determined to be invalid, wherein the first hash value of a System Information Block (SIB) or a Master Information Block (MIB) is calculated by the mobile communication terminal and included in the message, and wherein the verifying the validity of the first hash value comprises: identifying a SIB or a MIB related to the broadcast message; calculating a second hash value for the identified SIB or MIB; and determining that the first hash value included in the received message is valid when it matches the second hash value; and transmitting a message including information indicating receipt of a legitimate emergency text message to the communication terminal, when the first hash value included in the received message is determined to be valid, wherein the message including the first hash value is a message related to RRC Resume Complete.

2. A communication device comprising:

at least one processor; and a memory storing a computer program executed by the at least one processor, wherein the computer program includes instructions for operations of: receiving a Radio Resource Control (RRC) Resume Request message from a mobile communication terminal in an inactive state that has received a broadcast message related to an emergency text message; establishing an RRC connection with the mobile communication terminal; receiving a message including a first hash value from the mobile communication terminal with which the RRC connection has been established; verifying validity of the first hash value included in the received message; and transmitting a message including information indicating receipt of a false emergency text message, when the first hash value included in the received message is determined to be invalid, wherein the first hash value of a System Information Block (SIB) or a Master Information Block (MIB) is calculated by the mobile communication terminal and included in the message, wherein the verifying the validity of the first hash value comprises: identifying a SIB or a MIB related to the broadcast message; calculating a second hash value for the identified SIB or MIB; and determining that the first hash value included in the received message is valid when it matches the second hash value, wherein the computer program further includes instructions for an operation of transmitting, to the mobile communication terminal, a message including information indicating that a legitimate emergency text message has been transmitted, when the first hash value included in the received message is determined to be valid, and wherein the message including the first hash value is an RRC Resume Complete-related message.

\* \* \* \* \*